United States Patent
Katayama et al.

(10) Patent No.: US 8,200,867 B2
(45) Date of Patent: Jun. 12, 2012

(54) KVM SWITCH AND REMOTE SYSTEM

(75) Inventors: Shinichi Katayama, Shinagawa (JP);
Naoyuki Nagao, Shinagawa (JP);
Mitsuru Kobayashi, Shinagawa (JP);
Kenichi Fujita, Shinagawa (JP);
Akihiro Matsunaga, Shinagawa (JP);
Yu Sato, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 476 days.

(21) Appl. No.: 12/318,322

(22) Filed: Dec. 24, 2008

(65) Prior Publication Data
US 2009/0172222 A1    Jul. 2, 2009

(30) Foreign Application Priority Data
Dec. 28, 2007  (JP) ................................. 2007-340145

(51) Int. Cl.
*G06F 13/12* (2006.01)
(52) U.S. Cl. .......................................... 710/72; 710/36
(58) Field of Classification Search ...................... 710/72
See application file for complete search history.

(56) References Cited

U.S. PATENT DOCUMENTS

| | | | | |
|---|---|---|---|---|
| 6,958,950 B2 * | 10/2005 | Kim et al. | ................... | 367/8 |
| 2005/0076281 A1 | 4/2005 | Kojima | | |
| 2005/0246167 A1 * | 11/2005 | Nakajima et al. | ............. | 704/213 |
| 2005/0253713 A1 * | 11/2005 | Yokota | ........................... | 340/566 |
| 2007/0016034 A1 * | 1/2007 | Donaldson | ..................... | 600/437 |
| 2007/0115942 A1 * | 5/2007 | Money et al. | ................. | 370/352 |
| 2007/0121545 A1 * | 5/2007 | Park et al. | ....................... | 370/329 |
| 2007/0223917 A1 * | 9/2007 | Nagamine | .......................... | 398/1 |
| 2007/0282748 A1 * | 12/2007 | Saint Clair et al. | ............. | 705/51 |
| 2008/0177994 A1 * | 7/2008 | Mayer | ............................... | 713/2 |
| 2009/0157922 A1 * | 6/2009 | Lin | .................................. | 710/72 |

FOREIGN PATENT DOCUMENTS

| | | |
|---|---|---|
| JP | 9-127963 | 5/1997 |
| JP | 2001-092688 | 4/2001 |
| JP | 2003-296255 | 10/2003 |
| JP | 2003-534685 | 11/2003 |
| JP | 2007-228477 | 9/2007 |
| JP | 2007-317319 | 12/2007 |
| WO | 01/84291 A1 | 11/2001 |
| WO | 2006/005047 | 1/2006 |

OTHER PUBLICATIONS

Japanese Office Action issued Feb. 14, 2012 in corresponding Japanese Patent Application No. 2007-340145.

\* cited by examiner

*Primary Examiner* — Henry Tsai
*Assistant Examiner* — John Roche
(74) *Attorney, Agent, or Firm* — Staas & Halsey LLP

(57) ABSTRACT

A KVM switch which is connected between a plurality of servers, and a client to which a keyboard, a mouse, a display, and a speaker are connected, and switches a server connected to the client, the KVM switch including: a sound input portion that inputs sound data emitted from each server; an abnormal sound determination portion that determines whether the input sound data is an abnormal sound; and a notification portion that notifies the client of abnormality detection when it is determined that the input sound data is the abnormal sound.

16 Claims, 10 Drawing Sheets

Fig. 6

| SERVER ID | DATE-AND-TIME DATA | ABNORMAL SOUND FLAG | INFORMATION FLAG | SOUND DATA |
|---|---|---|---|---|
| 0 | 20070911183321 | 1 | 1 | 0100101010··· |
| 1 | 20071002102536 | 0 | 0 | 0101101010··· |
| 2 | 20071011224736 | 1 | 0 | 1100101110··· |
| 3 | 20071011225736 | 1 | 0 | 0101101010··· |

Fig. 8

| SERVER ID | warning_ID |
|---|---|
| 0 | 0 |
| 1 | 1 |
| 2 | 2 |
| 3 | 1 |

KVM SWITCH AND REMOTE SYSTEM

BACKGROUND OF THE INVENTION

1. Field of the Invention

The present invention relates to a KVM switch which is connected between a plurality of servers and a client, and switches a server connected to the client to another server, as well as a remote system including the KVM switch.

2. Description of the Related Art

Conventionally, there has been proposed a system in which a remote client PC is accessible to a plurality of servers via a network and a KVM switch connected to the network (see Japanese Patent Application Publication No. 2003-534685).

In the above-mentioned system, when a certain server emits an abnormal sound in an environment where a system administrator observes the plurality of servers from the client PC in a remote place (e.g., when an abnormal sound occurs by the damage of a hard disk in the server, or an abnormal sound occurs by the loosening of a screw in a point where the server is screwed to a rack, or the like), the system administrator could not detect the abnormal sound.

Even when the system administrator recognized the existence of the server emitting the abnormal sound by a report of a field-worker, it was difficult for the system administrator to specify a KVM switch connected to the server emitting the abnormal sound from the client PC in the remote place, in the environment with a lot of servers and KVM switches.

SUMMARY OF THE INVENTION

It is an object of the present invention to provide a KVM switch and a remote system which can improve usability of management and maintenance operations of a server.

According to a first aspect of the present invention, there is provided a KVM switch which is connected between a plurality of servers, and a client to which a keyboard, a mouse, a display, and a speaker are connected, and switches a server connected to the client, the KVM switch including: a sound input portion that inputs sound data emitted from each server; an abnormal sound determination portion that determines whether the input sound data is an abnormal sound; and a notification portion that notifies the client of abnormality detection when it is determined that the input sound data is the abnormal sound.

According to a second aspect of the present invention, there is provided a remote system which includes a plurality of servers, a client to which a keyboard, a mouse, a display, and a speaker are connected, and a KVM switch selectively connecting one of the servers to the client, the KVM switch including: a sound input portion that inputs sound data emitted from each server; an abnormal sound determination portion that determines whether the input sound data is an abnormal sound; and a notification portion that notifies the client of the sound data of the abnormal sound, or sound data showing a server emitting the abnormal sound, and the client including a first output portion that receives from the KVM switch and outputs the sound data of the abnormal sound, or the sound data showing the server emitting the abnormal sound.

BRIEF DESCRIPTION OF THE DRAWINGS

Preferred embodiments of the present invention will be described in detail with reference to the following drawings, wherein:

FIG. 6 is a diagram showing pieces of data and flags stored into an input sound storing unit 212;

FIG. 8 is a diagram showing data concerning a warning method in setting data stored into a setting storing unit 217;

DESCRIPTION OF THE PREFERRED EMBODIMENTS

A description will now be given, with reference to the accompanying drawings, of an embodiment of the present invention.

Figure 1:
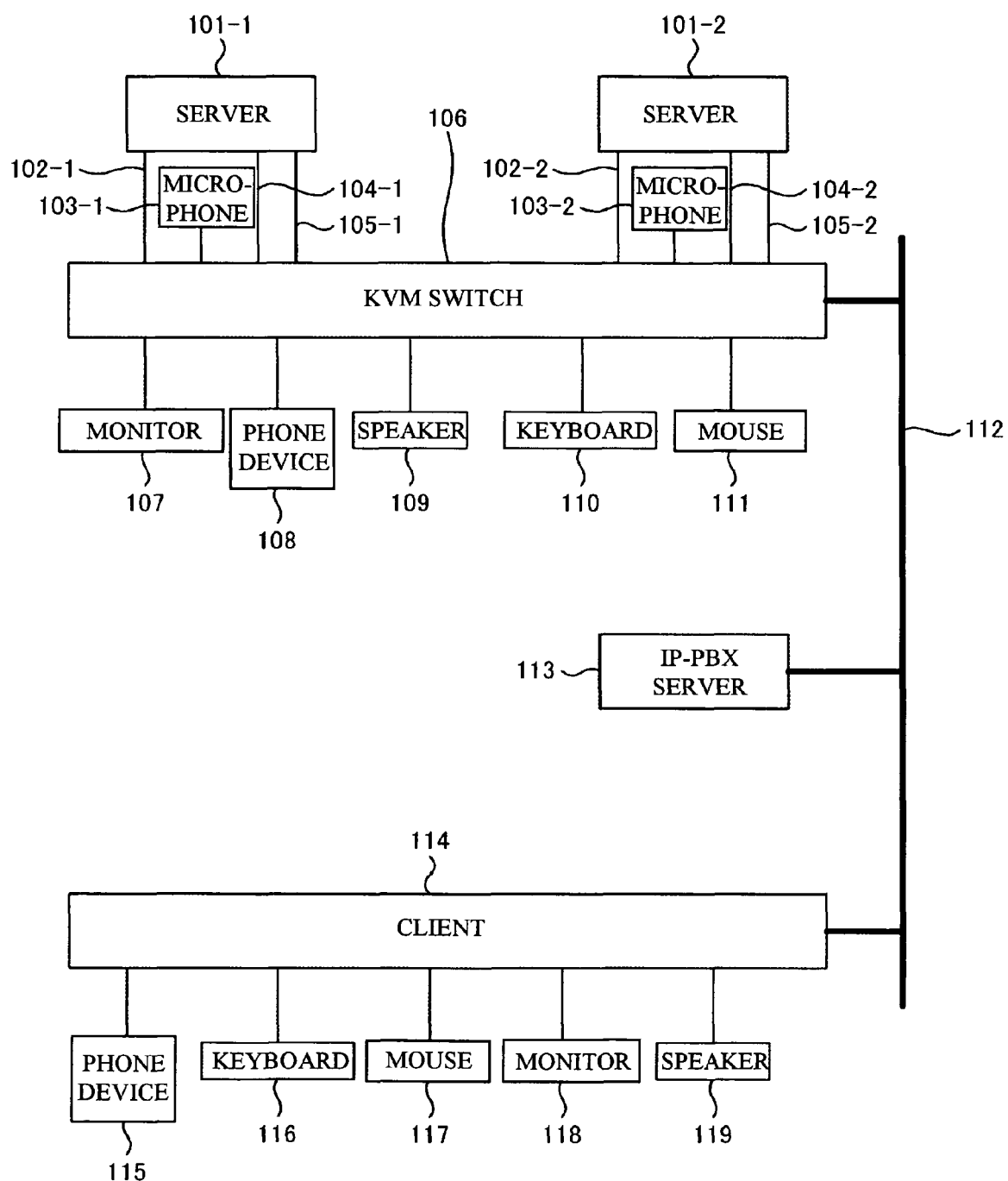
FIG. 1 is a schematic diagram showing a remote system according to a present embodiment.

FIG. 1 is a schematic diagram showing a remote system according to a present embodiment.

In FIG. 1, an remote system includes a plurality of servers 101-1 and 101-2, a KVM switch 106, an IP-PBX server 113, and a client 114. The plurality of servers 101-1 and 101-2, the KVM switch 106, the IP-PBX server 113, and the client 114 are connected to each other via a network 112. A plurality of KVM switches and clients may be connected to the network 112. Also, the number of servers connected to the KVM switch 106 may be a singular number or a plural number. In the following description, although the server 101-1 is used as an representative example of a server, the same description is applied to the server 101-2.

The KVM switch 106 is connected to the server 101-1 via a image signal line 102-1, a mouse signal line 104-1, and a key signal line 105-1. A microphone 103-1, a monitor 107, a phone device 108, a speaker 109, a keyboard 110 and a mouse 111 are connected to a KVM switch 106. A phone device 115, a keyboard 116, a mouse 117, a mouse 117, a monitor 118 and a speaker 119 are connected to the client 114.

The KVM switch 106 is composed of an IP-KVM switch, converts an image signal from the server 101-1 into an IP packet, and transmits the converted IP packet to the client 114 via the network 112. The IP packet is returned to the image signal with the client 114, and the image signal is displayed on the monitor 118.

The monitor 107 displays the image signal form the server 101-1. A key signal and a mouse signal input to the keyboard 110 and the mouse 111, respectively, are output to the server 101-1 via the key signal line 105-1 and the mouse signal line 104-1. The microphone 103-1 collects sounds emitted from the server 101 and surroundings thereof. The phone device 108 is an IP phone for executing phone conversation with the phone device 115 via the IP-PBX server 113. The speaker 109 emits the sounds collected with the microphone 103-1.

The client 114 converts the key signal of the keyboard 116 and the mouse signal of the mouse 117 into an IP packet, and transmits the IP packet to KVM switch 106 via the network 112. The IP packet is returned to the key signal and the mouse signal with the KVM switch 106, and the key signal and the mouse signal are output to the server 101-1.

The phone device 115 is an IP phone for executing phone conversation with the phone device 118 via the IP-PBX server 113. The IP-PBX server 113 provides an telephone network for the phone devices 108 and 115, and provides a function of PBX (Private Branch eXchange) that executes the connection and the control to an internal phone and an external public net. The PBX is a device which connects between internal phones, and connects the phone device to a public line.

The monitor 118 displays the image signal from the server 101-1. The speaker 119 emits the sounds collected with the microphone 103-1. At this time, sound data collected with the microphone 103-1 is transmitted from the KVM switch 106 to the client 114.

Figure 2:
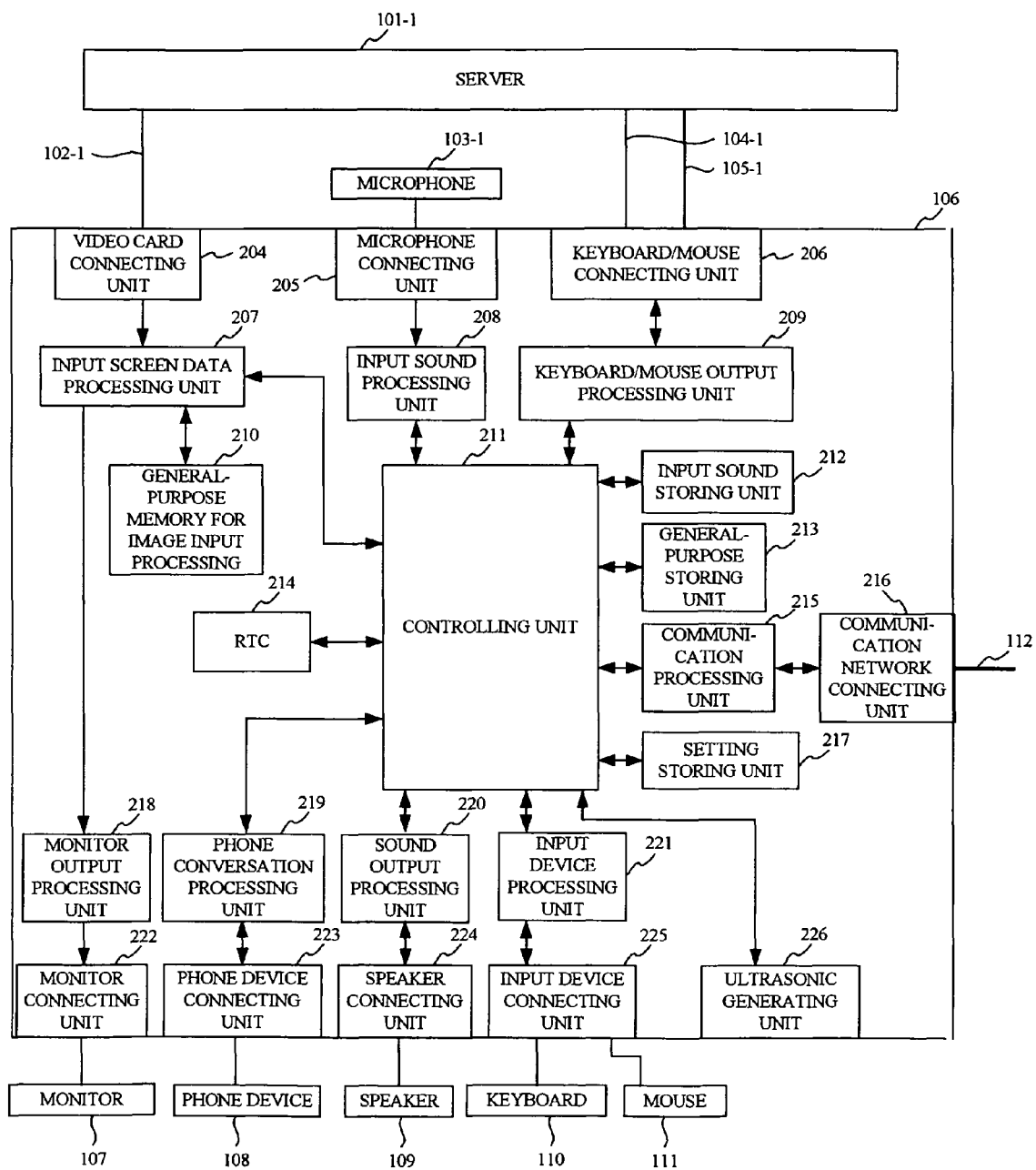
FIG. 2 is a block diagram showing the configuration of a KVM switch 106.

FIG. 2 is a block diagram showing the configuration of the KVM switch 106.

The KVM switch 106 includes a video card connecting unit 204, a microphone connecting unit 205 (a sound input portion), a keyboard/mouse connecting unit 206, an input screen data processing unit 207, an input sound processing unit 208 (a sound input portion), an keyboard/mouse output processing unit 209, a general-purpose memory for image input processing 210, a controlling unit 211 (an abnormal sound determination portion, a notification portion, a setting portion, an unnotification determination portion, and a date-and-time data notification portion), an input sound storing unit 212 (a storing portion), a general-purpose storing unit 213, a real-time clock (RTC) 214, a communication processing unit 215, a communication network connecting unit 216, a setting storing unit 217, a monitor output processing unit 218, a phone conversation processing unit 219 (a phone conversation portion), an sound output processing unit 220, an input device processing unit 221, a monitor connecting unit 222, a phone device connecting unit 223 (a phone conversation portion), a speaker connecting unit 224, an input device connecting unit 225, and an ultrasonic generating unit 226 (an ultrasonic generation portion).

The input screen data processing unit 207 receives the image signal from the server 101-1 via the video card connecting unit 204, and stores the image signal as screen data into the general-purpose memory for image input processing 210. The input screen data processing unit 207 outputs the screen data for one screen stored into the general-purpose memory for image input processing 210 to the monitor 107 via the monitor output processing unit 218 and the monitor connecting unit 222, or to the client 114, not shown, via the controlling unit 211, the communication processing unit 215, and the communication network connecting unit 216. When the screen data is output to the client 114, the controlling unit 211 packetizes the screen data.

The input sound processing unit 208 receives the sound data collected with the microphone 103-1 via the microphone connecting unit 205, and executes a digital conversion process, a echo/noise cancel process, and an encode/compression process, and so on to the sound data. The sound data to which these processes are executed is stored into the input sound storing unit 212 via the controlling unit 211.

The keyboard/mouse output processing unit 209 outputs the input key signal and the input mouse signal to the server 101-1 via the keyboard/mouse connecting unit 206. The IP packet corresponding to the key signal and the mouse signal input from the client 114 is returned to the key signal and the mouse signal with the controlling unit 211, and the key signal and the mouse signal are output to the keyboard/mouse output processing unit 209.

The controlling unit 211 controls the whole KVM switch 106. The real-time clock (RTC) 214 counts up the present date and time, and notifies the controlling unit 211 of the counted-up date and time. The setting storing unit 217 stores setting information of the KVM switch 106. The general-purpose storing unit 213 temporarily stores data and information, and stores communication logs. The communication processing unit 215 controls transmission and reception timing of the IP packet so as not to cause an error when communicating with the client 114.

The phone conversation processing unit 219 executes a digital conversion process, a echo/noise cancel process, an encode/compression process, and so on, to the sound data received from the phone device 108 via the phone device connecting unit 223. The sound data to which these processes are executed is converted into the IP packet with the controlling unit 211, and the converted IP packet is output to the IP-PBX server 113 via the communication processing unit 215, and the communication network connecting unit 216. The phone conversation processing unit 219 receives the sound data from the phone device 115 via the controlling unit 211, the communication processing unit 215, and the communication network connecting unit 216. The phone conversation processing unit 219 executes an analog conversion process, an decode/non-compression (decompression) process, and so on, to the received sound data, and outputs the sound data to which these processes are executed, to the phone device 108 via the phone device connecting unit 223.

The sound output processing unit 220 executes an decode/non-compression (decompression) process, an analog conversion process, and so on, to the input sound data, and outputs the sound data to which these processes are executed, to the speaker 109 via the speaker connecting unit 224.

The input device processing unit 221 receives the key signal or the mouse signal input from the keyboard 110 or the mouse 111 via the input device connecting unit 225, and outputs the key signal or the mouse signal input to the server 101-1 via the controlling unit 211, the keyboard/mouse output processing unit 209, or the keyboard/mouse connecting unit 206. Therefore, a user or an administrator can operate the server 101-1 from the keyboard 110 or the mouse 111.

The ultrasonic generating unit 226 generates an ultrasonic wave in response to an execution command of the controlling unit 211. When the generation of the ultrasonic wave is instructed on a menu screen of an OSD (On Screen Display) function included in the controlling unit 211, the execution command is output from the controlling unit 211 to the ultrasonic generating unit 226.

Therefore, the supersonic wave acts on an auditory nerve organ of a noxious animal or the like such as a cockroach and a rat, so that the noxious animal can be eliminated. Also, the KVM switch 106 including the ultrasonic generating unit 226 can be more advantageous in a cost than the case of setting up the ultrasonic generator newly, and the man-hour of maintenance management of the ultrasonic generator can be also reduced.

Figure 3:
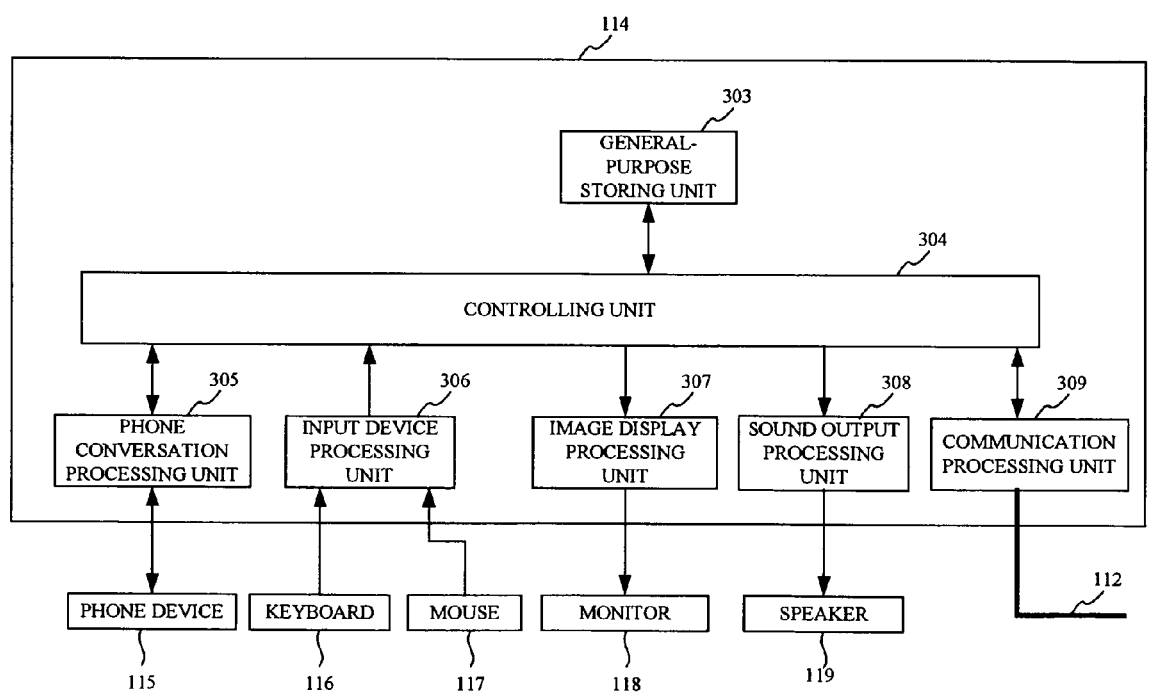
FIG. 3 is a block diagram showing the configuration of a client 114.

FIG. 3 is a block diagram showing the configuration of the client 114.

The client 114 includes a general-purpose storing unit 303, a controlling unit 304 (a first output portion, a determination portion, and a second output portion), a phone conversation processing unit 305 (a phone conversation portion), an input device processing unit 306, an image display processing unit 307 (a second output portion), a sound output processing unit 308 (a first output portion), and a communication processing unit 309. The controlling unit 304 is connected to the general-purpose storing unit 303, the phone conversation processing unit 305, the input device processing unit 306, the image display processing unit 307, the sound output processing unit 308, and the communication processing unit 309. The phone device 115 is connected to the phone conversation processing unit 305, and the keyboard 116 and the mouse 117 are connected to the input device processing unit 306. The monitor 118 is connected to the image display processing unit 307, and the speaker 119 is connected to the sound output processing unit 308. The network 112 is connected to the communication processing unit 309.

The general-purpose storing unit 303 stores programs and various data, and functions as a working area of the controlling unit 304.

The phone conversation processing unit 305 executes an digital conversion process, an echo/noise cancel process, an encode/compression process, and so on, to sound data received from the phone device 115. The sound data to which these processes are executed is converted into an IP packet with the controlling unit 304, and the converted IP packet is output to the IP-PBX server 113 via the communication processing unit 309. Also, the phone conversation processing unit 305 receives the sound data from the phone device 108, executes an analog conversion process, a decode/non-compression (decompression) process, an so on, to the received sound data, and outputs the sound data to which these processes are executed, to the phone device 115.

The input device processing unit 306 receives a key signal and a mouse signal showing respective operation contents of the keyboard 116 and the mouse 117, and outputs the key signal and the mouse signal to the controlling unit 304.

The image display processing unit 307 outputs screen data to the monitor 118, and the sound output processing unit 308 outputs sound data to the speaker 119. The screen data and the sound data transmitted from the KVM switch 106 are received as an IP packet via the communication processing unit 309. An analog conversion process or the like is executed to the screen data and the sound data with the controlling unit 304, and then the screen data and the sound data are output to the image display processing unit 307 and the sound output processing unit 308, respectively.

The controlling unit 304 executes intercommunication of the IP packet with the IP-PBX server 113 and the KVM switch 106 via the communication processing unit 309 and the network 112, produces IP packets from various received data, and executes a process to return the IP packets to original data. The controlling unit 304 executes acquiring dial operation of the phone device 115, and inputting and outputting sound via the phone conversation processing unit 305. That is, the controlling unit 304 uses the phone device 115 as an IP-phone, and the IP-PBX server 113 as an PBX, thereby providing a function of a so-called software phone for the user or the administrator.

The controlling unit 304 receives the key signal and the mouse signal showing respective operation contents of the keyboard 116 and the mouse 117, and outputs the screen data to the monitor 118 via the image display processing unit 307. The controlling unit 304 outputs the sound data from the KVM switch 106 to the speaker 119 via the sound output processing unit 308.

Figure 10:
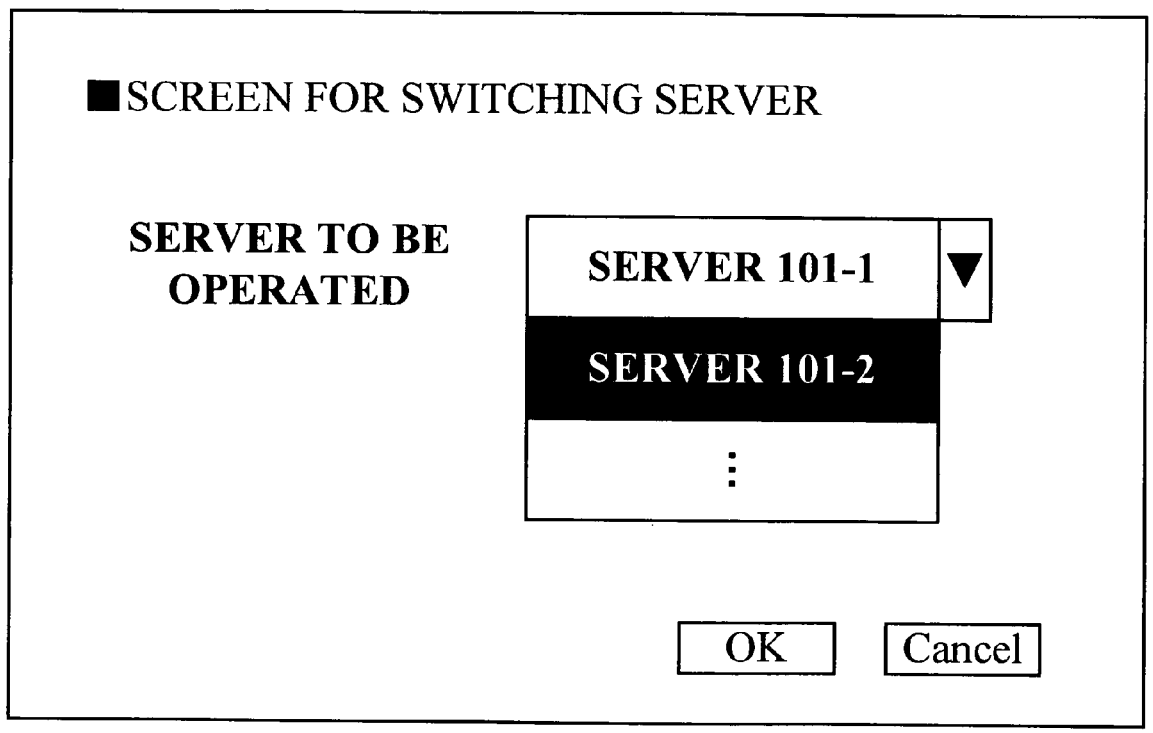
FIG. 10 is a diagram showing an example of a screen for switching a server.

When the user or the administrator makes the monitor 118 display a screen for switching a server as shown in FIG. 10 by the operation of a hot key (e.g. combination of a "Ctrl" key and a "Shift" key) or given mouse operation, and directs the switch of the server to be operated, the controlling unit 304 switches the screen data displayed on the monitor 118 from screen data of the server before the switching to screen data of the server after the switching, and switches the sound data output to the speaker 119 from sound data of the server before the switching to sound data of the server after the switching.

Figure 4:
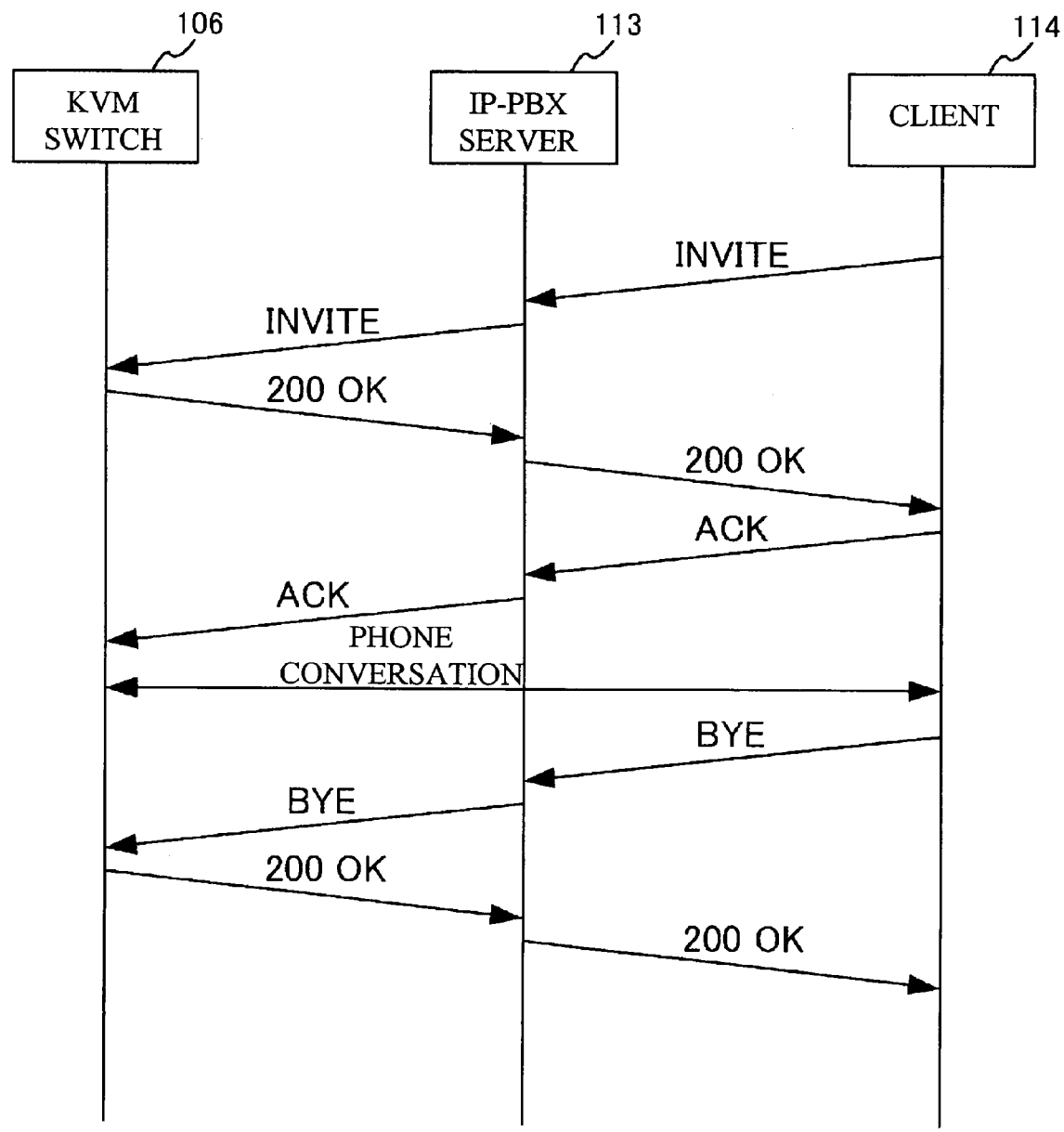
FIG. 4 is a diagram showing an example of a sequence of phone conversation between the KVM switch 106 and the client 114.

FIG. 4 is a diagram showing an example of a sequence of phone conversation between the KVM switch 106 and the client 114.

First, the client 114 transmits an INVITE message to the KVM switch 106 via the IP-PBX server 113.

The KVM switch 106 which has received the INVITE message executes a calling process from the other party, such as ringing a bell of the phone device 108, and transmits a "200 OK response" to the client 114 via the IP-PBX server 113 by off-hook of the phone device 108 (i.e., lifting a receiver of the phone device 108).

The client 114 transmits an "ACK response (agreement of session-establishment)" to the KVM switch 106 via the IP-PBX server 113, based on the "200 OK response" from the KVM switch 106. As a result, a session is produced between the KVM switch 106 and the client 114, and the sound data is transmitted and received on the produced session, to thereby be in a phone conversation state.

Then, when the phone device 115 of the client 114 becomes an on-hook state (i.e., the receiver of the phone device 115 is put down), a BYE request (i.e., a request for session disconnection) is transmitted from the client 114 to the KVM switch 106 via the IP-PBX server 113. The KVM switch 106 which has received the BYE request transmits the "200 OK response" to the client 114 via the IP-PBX server 113. As a result, the session is terminated, and the phone conversation is terminated. It should be noted that, in the case of the phone conversation, the IP packet communicated between the KVM switch 106 and the client 114 is a packet including an IP header, a UDP header, an RDP header, and sound code data.

Thus, in the present system, the IP-phone can be utilized between the KVM switch 106 and the client 114. Therefore, when a line other than a LAN line cannot be brought into a setting place of the server in the case where a field worker maintains the server (e.g. when special equipment exists in the setting place of the server, and hence a cell phone, a wireless terminal, and so on cannot be used), the phone conversation between the administrator operating the client 114 at a remote place and the field worker becomes easy.

Figure 5:
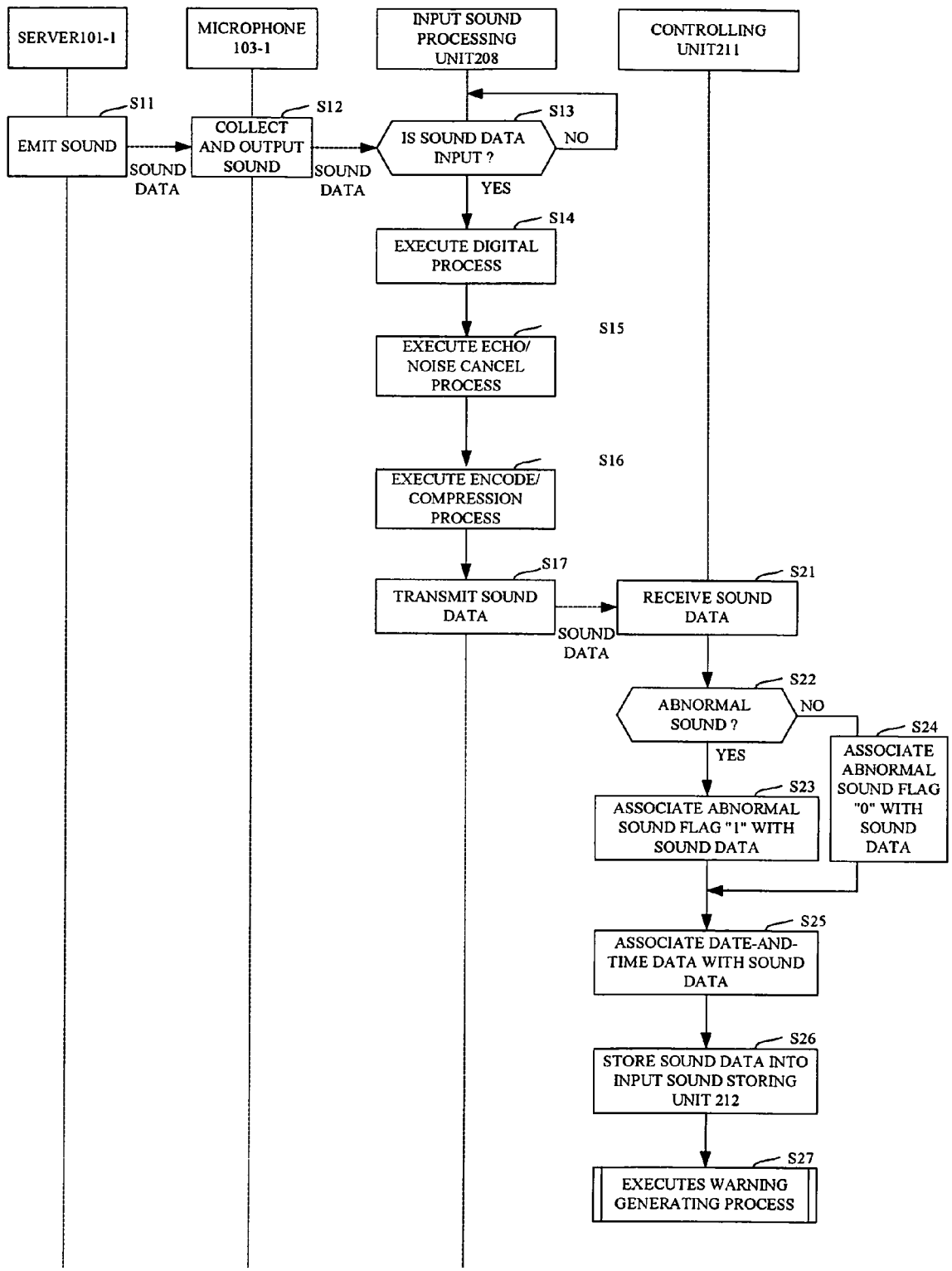
FIG. 5 is a flowchart showing a process executed with the KVM switch 106 after a sound emitted from a server 101-1 is detected.

FIG. 5 is a flowchart showing a process executed with the KVM switch 106 after the sound emitted from the server 101-1 is detected.

First, the server 101-1 emits a sound (step S11), the microphone 103-1 collects the sound, and outputs the sound data to the input sound processing unit 208 via the microphone connecting unit 205 (step S12).

The input sound processing unit 208 determines whether the sound data is input from the microphone 103-1 (step S13). When the answer to the determination of step S13 is "NO", the input sound processing unit 208 repeats the determination. On the other hand, when the answer to the determination of step S13 is "YES", the input sound processing unit 208 executes a digital process to the input sound data (step S14). The digital process means a process converting analog sound data into digital sound data.

Next, the input sound processing unit 208 executes the echo/noise cancel process eliminating an echo or a noise, and the encode/compression process reducing a data capacity of the sound data to the sound data after the digital process (steps S15 and S16). Then, the input sound processing unit 208 transmits the sound data after the encode/compression process to the controlling unit 211 (step S17).

The controlling unit 211 receives the sound data after the encode/compression process from the input sound processing unit 208 (step S21).

Next, the controlling unit 211 determines whether the sound data received from the input sound processing unit 208 is an abnormal sound (step S22). Specifically, when a frequency (Hz) of the sound data received from the input sound processing unit 208 deviates from a range of frequencies of the sound data set beforehand in case of normal, or the volume of the sound data received from the input sound processing unit 208 is larger than the volume of the sound data set beforehand in case of normal, the controlling unit 211 determines that the sound data received from the input sound processing unit 208 is the abnormal sound. It should be noted that the range of frequencies of the sound data in case of normal and the volume of the sound data in case of normal are stored into the general-purpose storing unit 213.

When the answer to the determination of step S22 is "YES", the controlling unit 211 associates an abnormal sound flag with the sound data (step S23), and additionally associates date-and-time data which shows the present date and time and is acquired from the RTC 214 with the sound data (step S25). The abnormal sound flag indicates that the sound data is the abnormal sound by "1", and that the sound data is no abnormal sound (i.e., normal sound) by "0". In step S23, the sound data is the abnormal sound, and hence the abnormal sound flag becomes "1". When the answer to the determination of step S22 is "NO", the controlling unit 211 associates the abnormal sound flag "0" with the sound data (step S24), and the procedure proceeds to step S25. As a result, the abnormal sound flag and the date-and-time data are associated with the sound data.

The controlling unit 211 stores the sound data with which the abnormal sound flag and the date-and-time data are associated into the input sound storing unit 212 (step S26), and executes a warning generating process described later (step S27). The present process is terminated.

FIG. 6 shows pieces of data and flags stored into the input sound storing unit 212. In addition to the abnormal sound flag and the date-and-time data, an information flag showing whether a server ID and the client 114 as a output source of the sound data are notified of the detection of the abnormal sound is associated with the sound data stored into the input sound storing unit 212. The information flag indicates that the client 114 is notified of the detection of the abnormal sound by "1", and that the client 114 is not notified of the detection of the abnormal sound by "0". A value of the information flag is set with the controlling unit 211.

Figure 7:
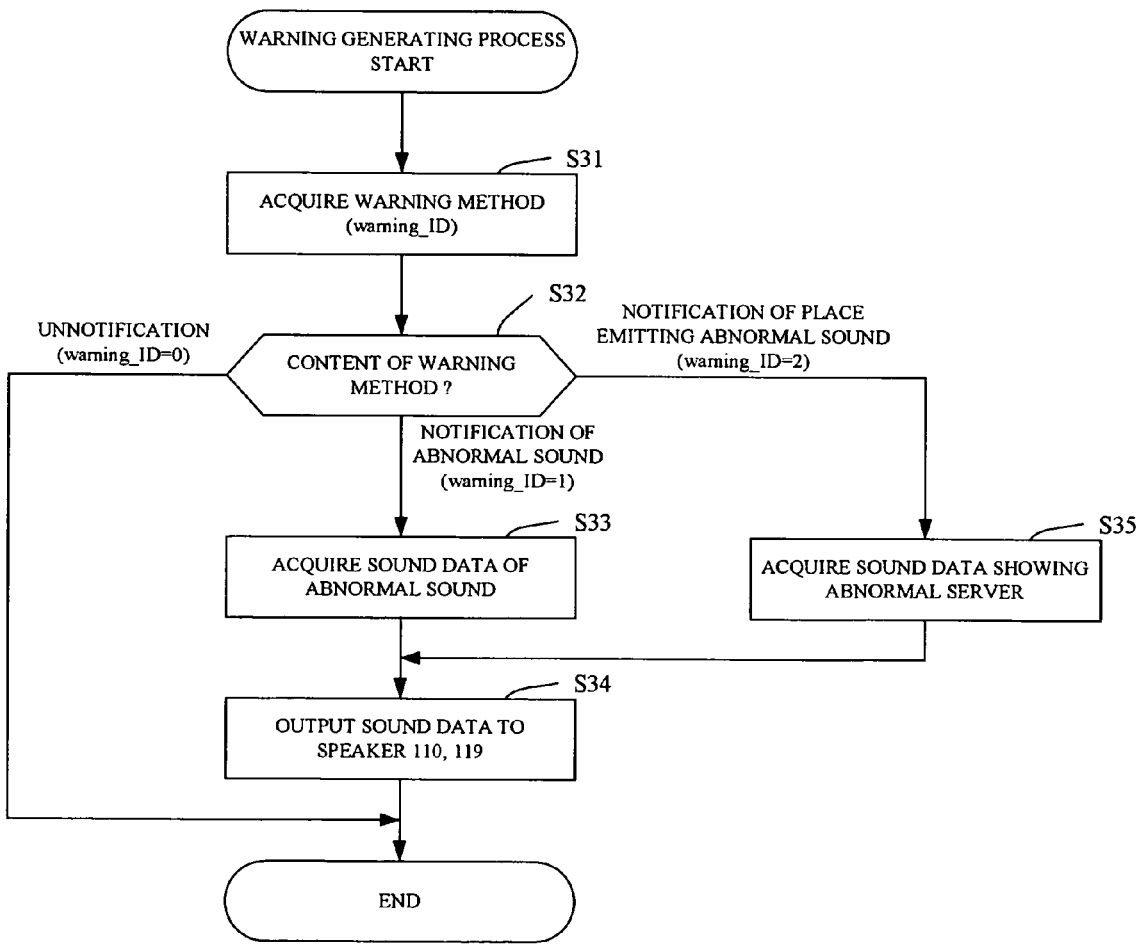
FIG. 7 is a flowchart showing a warning generating process of step S27 in FIG. 5.

FIG. 7 is a flowchart showing the warning generating process of step S27 in FIG. 5.

First, the controlling unit 211 acquires a warning method showing how to notify the user or the administrator of the detection of the abnormal sound emitted from the speaker 109 and speaker 119, from setting data stored into the setting storing unit 217 (step S31).

Figure 8:
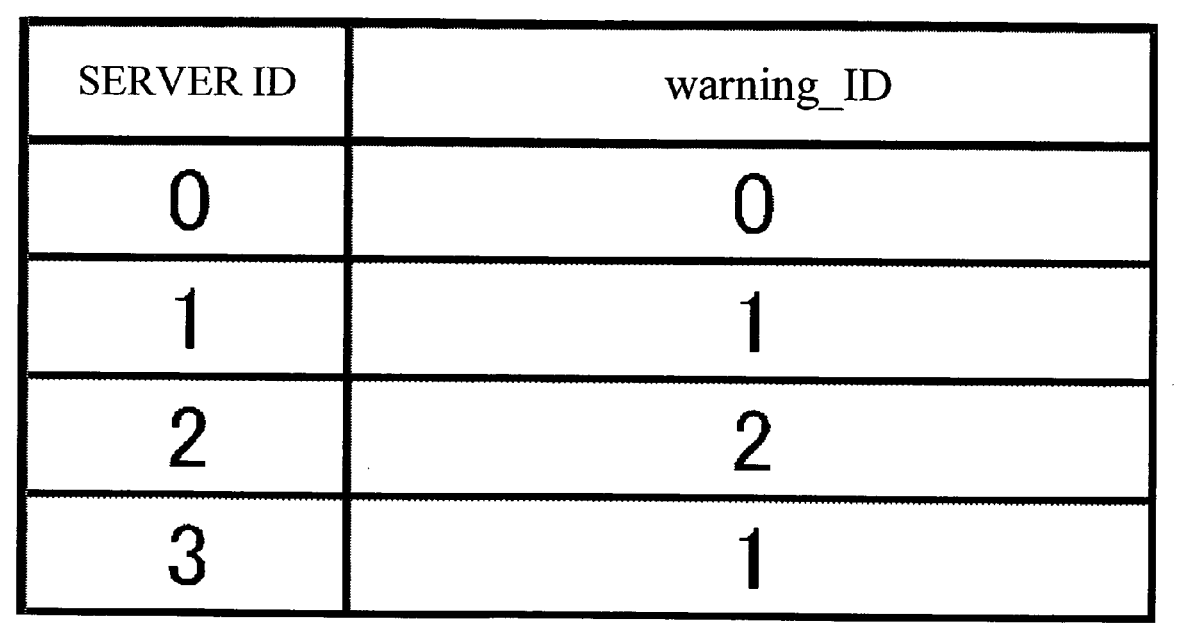

FIG. 8 is a diagram showing data concerning the warning method in the setting data stored into the setting storing unit 217. A warning_ID associated with the server ID is included in the setting data. When the warning_ID is "0", the controlling unit 211 does not notify the user or the administrator of the abnormal sound (i.e., the abnormal sound is not output from the speaker 109 and the speaker 119). When the warning_ID is "1", the controlling unit 211 notifies the user or the administrator of the abnormal sound itself (i.e., the sound data of the abnormal sound is not output from the speaker 109 and the speaker 119). When the warning_ID is "2", the controlling unit 211 notifies the user or the administrator of a position where the abnormal sound is detected, i.e., a server emitting the abnormal sound (e.g., sound data "the abnormal sound has been detected with the server 101-1" is output from the speaker 109 and the speaker 119). The setting and the changing of a value of the warning_ID are executed with the controlling unit 211 of the KVM switch 106 via the keyboard 110 or the mouse 111, or with the controlling unit 304 of the client 114 via the keyboard 116 or the mouse 117.

Next, the controlling unit 211 determines the content of the warning method acquired in step S31 (step S32). Specifically, the controlling unit 211 determines whether the warning_ID in the setting data is "0", "1", or "2".

When it is determined in step S32 that the warning_ID is "0", the controlling unit 211 terminates the present process without doing anything.

When it is determined in step S32 that the warning_ID is "1", the controlling unit 211 acquires the sound data of the abnormal sound which is associated with the server ID of the warning_ID "1", and in which the abnormal sound flag is "1" and the information flag is "0", from the input sound storing unit 212 (step S33). The controlling unit 211 outputs the acquired sound data of the abnormal sound to the speaker 109 via the sound output processing unit 220, and transmits the acquired sound data of the abnormal sound to the client 114 via the network 112. The controlling unit 304 of the client 114 outputs the sound data of the abnormal sound to the speaker 119 via the sound output processing unit 308 (step S34).

When it is determined in step S32 that the warning_ID is "2", the controlling unit 211 acquires sound data showing an abnormal server stored into the setting storing unit 217 (e.g., the sound data "the abnormal sound has been detected with the server 101-1") (step S35), outputs the sound data showing the abnormal server to the speaker 109 via the sound output processing unit 220, and to the speaker 119 via the network 112, the controlling unit 304, and the sound output processing unit 308 (step S34).

Figure 9:
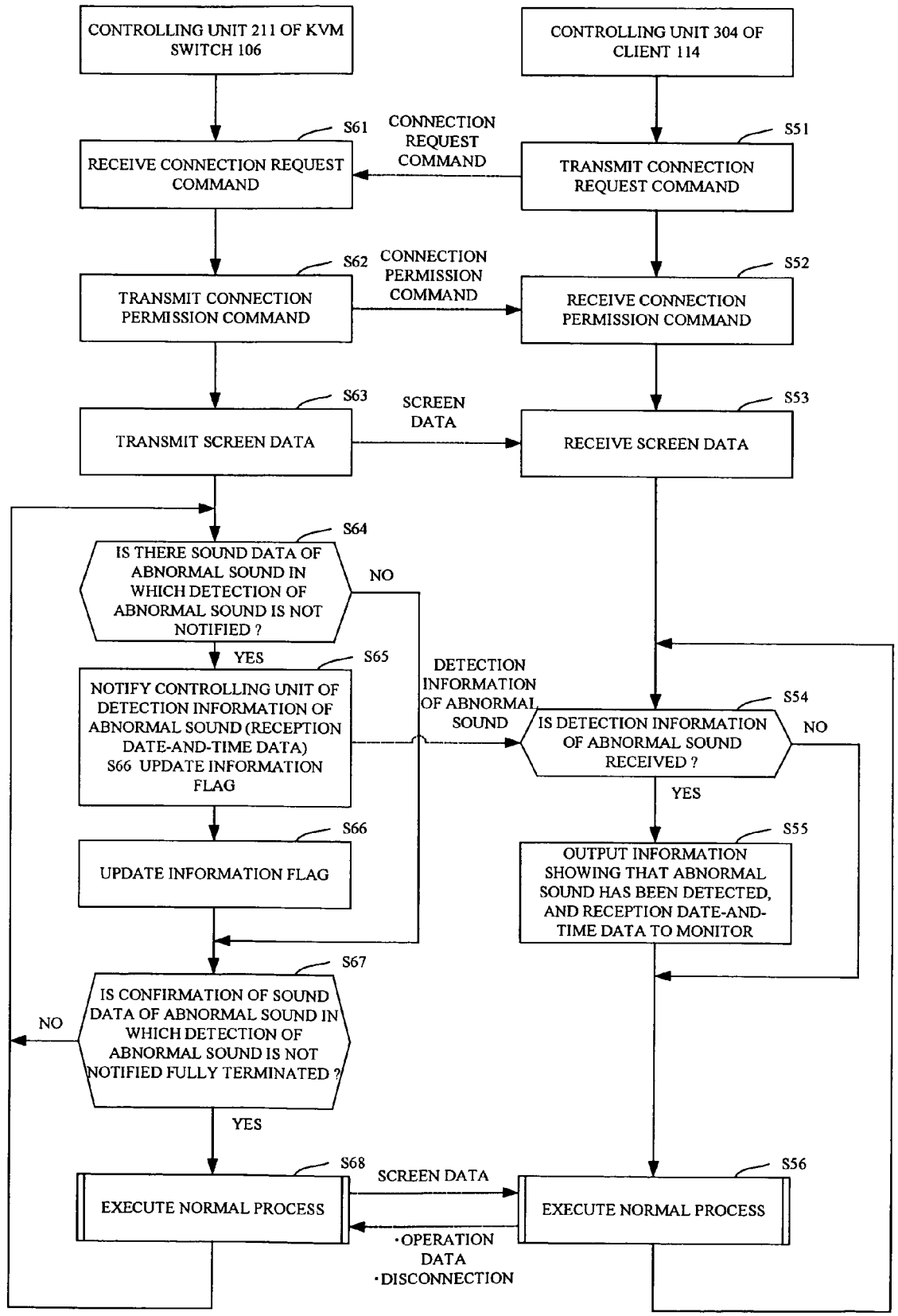
FIG. 9 is a diagram showing a process to notify the emission of an abnormal sound by a method different from the processes of FIGS. 5 and 7.

FIG. 9 is a diagram showing a process to notify the emission of the abnormal sound by a method different from the processes of FIGS. 5 and 7.

First, the controlling unit 304 of the client 114 transmits a connection request command for connecting to the server 101-1, to the KVM switch 106 (step S51). The controlling unit 211 of the KVM switch 106 receives the connection request command (step S61), and transmits a connection permission command to the controlling unit 304 of the client 114 (step S62). Then, the controlling unit 211 of the KVM switch 106 transmits the screen data from the server 101-1 to the controlling unit 304 of the client 114 (step S63).

The controlling unit 304 of the client 114 receives the connection permission command from the controlling unit 211 of the KVM switch 106 (step S52), and further receives the screen data from the server 101-1 (step S53).

The controlling unit 211 of the KVM switch 106 determines whether there is the sound data of the abnormal sound in which the detection of the abnormal sound is not notified, based on the information flag and the abnormal flag stored into the input sound storing unit 212 (step S64).

When the answer to the determination of step S64 is "YES", the controlling unit 211 of the KVM switch 106 notifies the controlling unit 304 of the client 114 of detection information of the abnormal sound (step S65). Specifically, the controlling unit 211 of the KVM switch 106 acquires reception date-and-time data associated with the sound data of the abnormal sound in which the detection of the abnormal sound is not notified, from the input sound storing unit 212, and transmits the reception date-and-time data to the controlling unit 304 of the client 114. According to the procedures of steps S64 and S65, the controlling unit 211 of the KVM switch 106 can notify the client 114 that sound data of unnotified abnormal sound is included in the pieces of sound data stored into the input sound storing unit 212.

The controlling unit 211 of the KVM switch 106 updates the information flag associated with the sound data of the abnormal sound in which the detection of the abnormal sound is not notified, i.e., changes the value of the information flag from "0" to "1" (step S66).

Next, the controlling unit 211 of the KVM switch 106 determines whether the confirmation of the sound data of the abnormal sound, which is stored into the input sound storing unit 212, in which the detection of the abnormal sound is not notified is fully terminated (step S67).

When the answer to the determination of step S67 is "NO", the procedure returns to step S64. On the other hand, when the answer to the determination of step S67 is "YES", the controlling unit 211 of the KVM switch 106 executes a normal process such as the transmission of the screen data to the client 114, and the reception of the operation data from the client 114 (step S68). The procedure returns to step S64.

After the procedure of step S53, the controlling unit 304 of the client 114 determines whether the detection information of the abnormal sound (specifically, the reception date-and-time data) is received from the controlling unit 211 of the KVM switch 106 (step S54).

When the answer to the determination of step S54 is "YES", the controlling unit 304 of the client 114 outputs information showing that the abnormal sound has been detected, and the reception date-and-time data to the monitor 118 via the image display processing unit 307 (step S55), and the procedure proceeds to step S56. At this time, the controlling unit 304 of the client 114 may switch the screen data from the server 101-1, to the information showing that the abnormal sound has been detected, and the reception date-and-time data, and output them to the monitor 118, or synthesize the information showing that the abnormal sound has been detected, and the reception date-and-time data with the screen data from the server 101-1, and output the screen data after the synthesis to the monitor 118. In any case, the administrator can confirm the emission of the abnormal sound by the server 101-1 and the emission date and time of the abnormal sound.

When the answer to the determination of step S54 is "NO", the controlling unit 304 of the client 114 executes a normal process such as the reception of the screen data from the server 101-1, and the transmission of the operation data to the server 101-1 (step S56). The procedure returns to step S54.

As described in detail hereinabove, according to the present embodiment, the microphone connecting unit 205 and the input sound processing unit 208 of the KVM switch 106 inputs sound data emitted from each server, and the controlling unit 211 determines whether the input sound data is the abnormal sound. When it is determined that the input sound data is the abnormal sound, the controlling unit 211 notifies the client 114 of abnormality detection via the communication processing unit 215 and the communication network connecting unit 216. Thus, since the abnormality of each server is monitored based on the sound data emitted from each server, and the client 114 is notified of the abnormality detection when the abnormality of each server is detected, it is possible to improve usability of management and maintenance operations of each server.

The controlling unit 211 sets the method of notifying the client 114 of the abnormality detection for each server, and notifies the client 114 of the abnormality detection depending on the set method. Therefore, it is possible to switch the notification method of the abnormality detection for each server. Further, the controlling unit 211 sets any one of not notifying the client 114 of the abnormality detection, notifying the client 114 of the sound data of the abnormal sound, and notifying the client 114 of the sound data showing the server emitting the abnormal sound. Therefore, the controlling unit 211 can set the notification method of the abnormality detection including existence or nonexistence of the notification of the abnormality detection.

When it is determined that the input sound data is the abnormal sound, the controlling unit 211 of the KVM switch 106 notifies the client 114 of the sound data of the abnormal sound or the sound data showing the server emitting the abnormal sound. The controlling unit 303 and the sound output processing unit 308 of the client 114 receives the sound data of the abnormal sound or the sound data showing the server emitting the abnormal sound from the KVM switch 106, and outputs the received sound data of the abnormal sound or the received sound data showing the server emitting the abnormal sound. Therefore, the KVM switch 106 monitors the abnormality of each server based on the sound data emitted from each server, and when the abnormality is detected, the client 114 outputs the sound data of the abnormal sound or the sound data showing the server emitting the abnormal sound. As a result, it is possible to improve usability of management and maintenance operations of each server.

It should be noted that the present invention is not limited to the embodiment, and various modifications may be made to them without departing from the scope of the invention.

Several aspects of the present invention are summarized below.

According to a first aspect of the present invention, there is provided a KVM switch which is connected between a plurality of servers, and a client to which a keyboard, a mouse, a display, and a speaker are connected, and switches a server connected to the client, the KVM switch including: a sound input portion that inputs sound data emitted from each server; an abnormal sound determination portion that determines whether the input sound data is an abnormal sound; and a notification portion that notifies the client of abnormality detection when it is determined that the input sound data is the abnormal sound.

With the above arrangement, since the abnormality of each server is monitored based on the sound data emitted from each server, and the client is notified of the abnormality detection when the abnormality of each server is detected, it is possible to improve usability of management and maintenance operations of a server connected to the KVM switch.

Preferably, the KVM switch further includes a setting portion that sets a method of notifying the client of the abnormality detection for each server, wherein the notification portion notifies the client of abnormality detection depending on the method set by the setting portion.

With the above arrangement, it is possible to switch the notification method of the abnormality detection for each server.

More preferably, the setting portion sets any one of not notifying the client of the abnormality detection, notifying the client of the sound data, and notifying the client of sound data showing a server emitting the abnormal sound.

With the above arrangement, the setting portion can set the notification method of the abnormality detection including existence or nonexistence of the notification of the abnormality detection.

Preferably, the KVM switch further includes a storing portion that associates a first flag showing whether the sound data is the abnormal sound, a second flag showing whether the sound data is sound data in which the client is not notified of the abnormality detection, and date-and-time data showing reception date and time of the abnormal sound with the sound data, and stores the sound data associate with the first flag, the second flag, and the date-and-time data, an unnotification determination portion that determines whether there is the sound data of the abnormal sound in which the client is not notified of the abnormality detection, based on the first flag and the second flag, and a date-and-time data notification portion that notifies the client of the date-and-time data associated with the sound data when it is determined that there is the sound data of the abnormal sound in which the client is not notified of the abnormality detection.

With the above arrangement, it is possible to notify the client that sound data of unnotified abnormal sound is included in the pieces of the sound data stored into the storing portion.

Preferably, the KVM switch is connected to the client via a network and an IP-PBX device, and includes a phone conversation portion that is capable of executing IP-phone conversation with the client.

With the above arrangement, when a line other than a network line cannot be brought into a setting place of the server in the case where a field worker maintains the server (e.g. when special equipment exists in the setting place of the server, and hence a cell phone, a wireless terminal, and so on cannot be used), the phone conversation between an administrator operating the client and the field worker becomes easy.

Preferably, the KVM switch further includes an ultrasonic generation portion that generates an ultrasonic wave.

With the above arrangement, the supersonic wave acts on an auditory nerve organ of a noxious animal or the like such as a cockroach and a rat, so that the noxious animal can be eliminated.

According to a second aspect of the present invention, there is provided a remote system which includes a plurality of servers, a client to which a keyboard, a mouse, a display, and a speaker are connected, and a KVM switch selectively connecting one of the servers to the client, the KVM switch including: a sound input portion that inputs sound data emitted from each server; an abnormal sound determination portion that determines whether the input sound data is an abnormal sound; and a notification portion that notifies the client of the sound data of the abnormal sound, or sound data showing a server emitting the abnormal sound, and the client including a first output portion that receives from the KVM switch and outputs the sound data of the abnormal sound, or the sound data showing the server emitting the abnormal sound.

With the above arrangement, since the KVM switch monitors the abnormality of each server based on the sound data emitted from each server, and the client is notified of the sound data of the abnormal sound, or sound data showing a server emitting the abnormal sound when the abnormality of the server is detected, it is possible to improve usability of management and maintenance operations of a server connected to the KVM switch.

Preferably, the KVM switch further includes a storing portion that associates a first flag showing whether the sound data is the abnormal sound, a second flag showing whether the sound data is sound data in which the client is not notified of abnormality detection, and date-and-time data showing reception date and time of the abnormal sound with the sound data, and stores the sound data associate with the first flag, the second flag, and the date-and-time data, an unnotification determination portion that determines whether there is the sound data of the abnormal sound in which the client is not notified of the abnormality detection, based on the first flag and the second flag, and a date-and-time data notification portion that notifies the client of the date-and-time data associated with the sound data when it is determined that there is the sound data of the abnormal sound in which the client is not notified of the abnormality detection.

With the above arrangement, it is possible to notify the client that sound data of unnotified abnormal sound is included in the pieces of the sound data stored into the storing portion.

More preferably, the client further includes a determination portion that determines whether the date-and-time data is received from the KVM switch, and a second output portion that outputs information showing that the abnormal sound has been detected, and the date-and-time data to the display when it is determined that the date-and-time data is received from the KVM switch.

With the above arrangement, it is possible to notify an administrator of the client of information showing that the abnormal sound has been detected, and the date-and-time data.

Preferably, the KVM switch and the client are connected to each other via a network and an IP-PBX device, and each of the KVM switch and the client include a phone conversation portion that is capable of executing IP-phone conversation.

With the above arrangement, when a line other than a network line cannot be brought into a setting place of the server in the case where a field worker maintains the server (e.g. when special equipment exists in the setting place of the server, and hence a cell phone, a wireless terminal, and so on cannot be used), the phone conversation between an administrator operating the client and the field worker becomes easy.

Preferably, the KVM switch further includes an ultrasonic generation portion that generates an ultrasonic wave.

With the above arrangement, the supersonic wave acts on an auditory nerve organ of a noxious animal or the like such as a cockroach and a rat, so that the noxious animal can be eliminated.

The Present application is based on Japanese Patent Application No. 2007-340145 filed Dec. 28, 2007, the entire disclosure of which is hereby incorporated by reference.

What is claimed is:

1. A KVM switch which is connected between a plurality of servers, and a client to which a keyboard, a mouse, a display, and a speaker are connected, and switches a server connected to the client, the KVM switch comprising:
a sound input portion that inputs sound data emitted from each server and sound from surroundings of each server;
a sound processing portion that cancels the sound from the surroundings from the input sound data;
an abnormal sound determination portion that determines whether the input sound data is an abnormal sound; and
a notification portion that notifies the client of abnormality detection when it is determined that the input sound data is the abnormal sound.

2. The KVM switch as claimed in claim 1, further comprising a setting portion that sets a method of notifying the client of the abnormality detection for each server,
wherein the notification portion notifies the client of abnormality detection depending on the method set by the setting portion.

3. The KVM switch as claimed in claim 2, wherein the setting portion sets any one of not notifying the client of the abnormality detection, notifying the client of the sound data, and notifying the client of sound data showing a server emitting the abnormal sound.

4. The KVM switch as claimed in claim 1, further comprising:

a storing portion that associates a first flag showing whether the sound data is the abnormal sound, a second flag showing whether the sound data is sound data in which the client is not notified of the abnormality detection, and date-and-time data showing reception date and time of the abnormal sound with the sound data, and stores the sound data associated with the first flag, the second flag, and the date-and-time data;

an unnotification determination portion that determines whether there is sound data of the abnormal sound in which the client is not notified of the abnormality detection, based on the first flag and the second flag; and a date-and-time data notification portion that notifies the client of the date-and-time data associated with the sound data when it is determined that there is the sound data of the abnormal sound in which the client is not notified of the abnormality detection.

5. The KVM switch as claimed in claim 1, wherein the KVM switch is connected to the client via a network and an IP-PBX device, and includes a phone conversation portion that is capable of executing IP-phone conversation with the client.

6. The KVM switch as claimed in claim 1, further comprising an ultrasonic generation portion that generates an ultrasonic wave.

7. The KVM switch as claimed in claim 2, further comprising:

a storing portion that associates a first flag showing whether the sound data is the abnormal sound, a second flag showing whether the sound data is sound data in which the client is not notified of the abnormality detection, and date-and-time data showing reception date and time of the abnormal sound with the sound data, and stores the sound data associated with the first flag, the second flag, and the date-and-time data;

an unnotification determination portion that determines whether there is sound data of the abnormal sound in which the client is not notified of the abnormality detection, based on the first flag and the second flag; and a date-and-time data notification portion that notifies the client of the date-and-time data associated with the sound data when it is determined that there is the sound data of the abnormal sound in which the client is not notified of the abnormality detection.

8. The KVM switch as claimed in claim 2, wherein the KVM switch is connected to the client via a network and an IP-PBX device, and includes a phone conversation portion that is capable of executing IP-phone conversation with the client.

9. The KVM switch as claimed in claim 2, further comprising an ultrasonic generation portion that generates an ultrasonic wave.

10. A remote system comprising a plurality of servers, a client to which a keyboard, a mouse, a display, and a speaker are connected, and a KVM switch selectively connecting one of the servers to the client, the KVM switch including:

a sound input portion that inputs sound data emitted from each server and sound from surroundings of each server;

a sound processing portion that cancels the sound from the surroundings from the input sound data;

an abnormal sound determination portion that determines whether the input sound data is an abnormal sound; and a notification portion that notifies the client of the sound data of the abnormal sound, or sound data showing a server emitting the abnormal sound, and the client including a first output portion that receives from the KVM switch and outputs the sound data of the abnormal sound, or the sound data showing the server emitting the abnormal sound.

11. The remote system as claimed in claim 10, wherein the KVM switch further includes a storing portion that associates a first flag showing whether the sound data is the abnormal sound, a second flag showing whether the sound data is sound data in which the client is not notified of abnormality detection, and date-and-time data showing reception date and time of the abnormal sound with the sound data, and stores the sound data associated with the first flag, the second flag, and the date-and-time data, an unnotification determination portion that determines whether there is sound data of the abnormal sound in which the client is not notified of the abnormality detection, based on the first flag and the second flag, and a date-and-time data notification portion that notifies the client of the date-and-time data associated with the sound data when it is determined that there is the sound data of the abnormal sound in which the client is not notified of the abnormality detection.

12. The remote system as claimed in claim 11, wherein the client further includes a determination portion that determines whether the date-and-time data is received from the KVM switch, and a second output portion that outputs information showing that the abnormal sound has been detected, and the date-and-time data to the display when it is determined that the date-and-time data is received from the KVM switch.

13. The remote system as claimed in claim 10, wherein the KVM switch and the client are connected to each other via a network and an IP-PBX device, and each of the KVM switch and the client include a phone conversation portion that is capable of executing IP-phone conversation.

14. The remote system as claimed in claim 10, wherein the KVM switch further includes an ultrasonic generation portion that generates an ultrasonic wave.

15. The remote system as claimed in claim 11, wherein the KVM switch and the client are connected to each other via a network and an IP-PBX device, and each of the KVM switch and the client include a phone conversation portion that is capable of executing IP-phone conversation.

16. The remote system as claimed in claim 11, wherein the KVM switch further includes an ultrasonic generation portion that generates an ultrasonic wave.

* * * * *